United States Patent [19]
Evertz et al.

[11] 3,822,509
[45] July 9, 1974

[54] LONG-ARM GRINDING MACHINE

[75] Inventors: Egon Evertz, Vorlander Strasse 23, 565 Solingen; Rolf Seybold, Solingen, Germany

[73] Assignee: said Evertz, by said Seybold

[22] Filed: Mar. 27, 1973

[21] Appl. No.: 345,295

Related U.S. Application Data
[62] Division of Ser. No. 160,676, July 8, 1971, abandoned.

[52] U.S. Cl.................... 51/40, 51/32, 51/33 R, 51/290
[51] Int. Cl............................................. B24b 5/40
[58] Field of Search...... 51/33 R, 34 R, 34 H, 34 C, 51/34 D, 46, 47, 35, 180, 111, 227 R, 290, 32

[56] References Cited
UNITED STATES PATENTS
1,966,869 7/1934 Owen.................................. 51/40
2,722,087 11/1955 Hamilton........................... 51/40 X
3,348,342 10/1967 Zachek.................................. 51/180
3,603,038 9/1971 Manabe.............................. 51/47 X

*Primary Examiner*—Donald G. Kelly
*Attorney, Agent, or Firm*—Holman & Stern

[57] ABSTRACT

A grinding machine for use in the machining of elongated surfaces, the machine having rotatable grinding means comprising at least two grinding heads disposed respectively at one end of two long shafts and rotatable respectively in two bearings which are interconnected by means of a piston and cylinder unit whereby said grinding heads can be urged towards or away from each other on actuation of said unit.

2 Claims, 2 Drawing Figures

PATENTED JUL 9 1974   3,822,509

LONG-ARM GRINDING MACHINE

This application is a division of our copending application Ser. No. 160,676, filed July 8, 1971 now abandoned.

BACKGROUND OF THE INVENTION

This invention relates to a long-arm grinding machine for the machining of elongated surfaces, and in particular the inside surfaces of iron chills for steel-making, in which rotating grinding means are arranged on the end of a long shaft which is movable longitudinally along the length of the surfaces to be machined.

PRIOR ART

Known long-arm grinding machines of this kind are limited in their grinding capacity by the fact that the loading of the grinding head carried by the long shaft leads to a torque through which said shaft tries to bend. In addition to this, where the long shaft is also arranged to move in a direction at right angles to its length either in the direction of rotation of the grinding head or in the opposite direction, variable strong forces are needed for this movement so that any proposed automatic drive is variably but heavily loaded. One object of the present invention is to provide a long-arm grinding machine in which the bending of the long shaft as well as the variably heavy loading of the drive are prevented.

SUMMARY OF THE INVENTION

In accordance with the invention, there is provided a long-arm grinding machine for the machining of elongated surfaces of the kind wherein rotatable grinding means are disposed on one end of long shaft means movable in a longitudinal direction parallel to the length of an elongated surface to be machined and pivotable adjacent to its other end about an axis transverse to its length, characterized in that the rotatable grinding means comprise at least two grinding heads which are disposed respectively on one end of two long shafts and which rotate respectively in two bearings which are connected together by means of a piston and cylinder unit which is connected to a source of pressurized fluid whereby said grinding heads can be urged towards or away from each other.

By means of such an arrangement, it is possible to machine vertically standing surfaces. In this way, the grinding heads do not have to work in the grinding dust. Furthermore, since two opposite surfaces can always be ground, the grinding capacity is at least doubled. Without having to exert forces from the outside on the grinding shaft bearings, the grinding pressure can be adjusted to the desired amount and above all as a function of the deflection of the grinding shaft bearings, by electrically-actuated means acting on said piston and cylinder unit. The grinding pressure can be arranged to depend therefore on the position at any one time of the grinding heads in their grinding path. Above all the grinding pressure can be reduced (where the long shafts are arranged to swing about axes at right angles to their length) at the ends of the swings of said shafts where it is inevitable that the grinding heads will remain longer in contact with the surface being ground so that the removal of material can be made equal over the whole of the surface being ground. On the other hand, if so desired, said removal can be made heavier in some parts than in others.

The invention will now be more particularly described with reference to the accompanying drawings wherein:

DETAILED DESCRIPTION OF THE INVENTION

Figure 1:
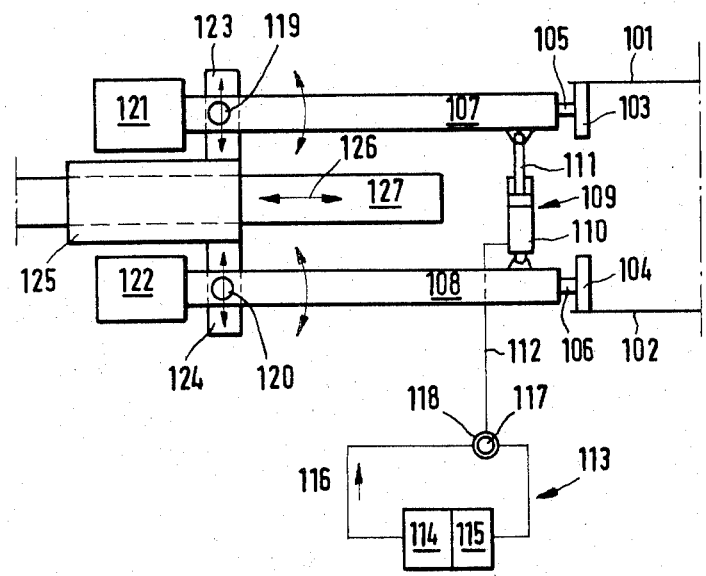
FIG. 1 is a diagrammatic plan view showing one example of a long-arm grinding machine constructed in accordance with the invention.

Referring to the drawings, FIG. 1 shows firstly two opposite surfaces 101 and 102 which are to be ground by means of grinding heads 103 and 104. These grinding heads are arranged on the ends of shafts 105 and 106 which in turn are supported in shaft bearings which are constructed as bearing tubes 107 and 108. Near the grinding heads 103 and 104, the bearing tubes 107 and 108 are connected together by a cylinder-piston unit 109. The bearing tube 108 is hinged onto cylinder 110 while the bearing tube 107 is hingedly connected to piston rod 111. The cylinder is connected, via a conduit 112, to a pressurized fluid circuit illustrated diagrammatically by 113. The latter consists of a pump 114 which pumps fluid such as oil from a reservoir 115 into a pipe 116.. The circuit also includes a valve 118 which can be adjustably set as required in dependence on the relative angle between the bearing tubes 107 and 108 so that the cylinder 110 is variably loaded by the pressure of the pressurized fluid.

The bearing tubes 107 and 108 can be pivoted in joints 119 and 120 disposed at their ends remote from the grinding head 103 and 104. In this way, the grinding means 103 and 104 can take up various positions according to the loading of the cylinder 110 and can in particular be positioned on the opposite surfaces 101 and 102 with varying force. On the ends of the bearing tubes 107 and 108, drives 121 and 122 for said shafts 105 and 106 are also fitted. Said joints 119 and 120 are fitted on arms 123 and 124 of a carriage 125 movable on a support 127 whereby the bearing tubes 107 and 108 can be moved in directions parallel to the length of surfaces 101 and 102 as shown by the double arrow 126.

Figure 2:
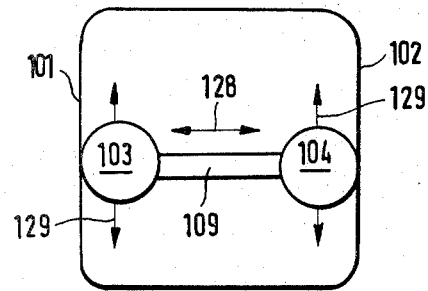
FIG. 2 is an end view of the grinding heads seen in FIG. 1.

The end view of the grinding head 103 and 104 as seen in FIG. 2 shows that these heads are moved along the opposite vertical surfaces 101 and 102 of an iron chill which is in a lying position, which said grinding heads being adjusted in the direction of the double arrow 128 by the piston cylinder unit 109 and furthermore being capable of a vertical swivelling movement in the direction of the double arrows 129.

We claim:

1. A long-arm grinding machine for the machining of two opposed elongated internal surfaces of a hollow object, comprising two grinding heads disposed respectively at one end of two long shafts, said shafts being movable in a longitudinal direction parallel to the length of the elongated surfaces to be machined, said shafts being rotatable respectively in two bearing tubes, with the axes of said shafts being disposed in a common plane, each of said shafts being pivotable adjacent to its other end about an axis which is perpendicular to its own axis, and said two bearing tubes being connected together adjacent to said one end of said shafts by a single piston and cylinder unit connected to a source of pressurized fluid whereby actuation of said unit will result in pivoting of said shafts about said pivotable ends to urge said grinding heads towards or away from each other.

2. The long-arm grinding machine as claimed in claim 1 characterized in that said piston and cylinder unit is connected in a circuit which includes a valve having a valve member which is adjustable to vary the pressure of fluid supplied to said piston and cylinder unit and thereby vary the pressure applied by said grinding heads to the surface or surfaces being machined.

* * * * *

UNITED STATES PATENT OFFICE
CERTIFICATE OF CORRECTION

Patent No. 3822509                    Dated    July 9, 1974

Inventor(s)   Egon Evertz, et al

It is certified that error appears in the above-identified patent and that said Letters Patent are hereby corrected as shown below:

[32] Foreign Priority Document
    German No. 2048407.5 filed October 2, 1970

Signed and sealed this 5th day of November 1974.

(SEAL)
Attest:

McCOY M. GIBSON JR.                    C. MARSHALL DANN
Attesting Officer                       Commissioner of Patents